United States Patent [19]

Pieh et al.

[11] Patent Number: 5,405,425
[45] Date of Patent: Apr. 11, 1995

[54] SOIL CONDITIONERS

[75] Inventors: Stefan Pieh, Leonding; Johann Krammer, Linz, both of Austria

[73] Assignee: Chemie Linz Gesellschaft m.b.H., Linz, Austria

[21] Appl. No.: 820,017

[22] Filed: Jan. 13, 1992

Related U.S. Application Data

[63] Continuation of Ser. No. 566,232, Aug. 9, 1990, abandoned.

[30] Foreign Application Priority Data

Aug. 31, 1989 [AT] Austria .................................. 2050/89

[51] Int. Cl.⁶ .......................... C05G 3/04; C09K 17/00
[52] U.S. Cl. ........................ 71/27; 71/64.11; 71/903; 71/904; 106/900; 405/263; 405/264; 405/270
[58] Field of Search ............. 405/264; 71/64.07, 64.11

[56] References Cited

U.S. PATENT DOCUMENTS

| | | | |
|---|---|---|---|
| 4,164,413 | 8/1979 | Jinno et al. | 71/103 |
| 4,168,962 | 9/1979 | Lambeth | 71/904 X |
| 4,440,649 | 4/1984 | Loftin et al. | 252/8.5 |
| 4,502,966 | 3/1985 | Giddings et al. | 252/8.5 C |
| 4,669,920 | 6/1987 | Dymond | 405/263 X |
| 4,762,545 | 8/1988 | Youssef et al. | 71/904 X |
| 4,867,613 | 9/1989 | McLeod et al. | 405/263 |

FOREIGN PATENT DOCUMENTS

| | | |
|---|---|---|
| 1134981 | 11/1982 | Canada . |
| 0072214A1 | 2/1983 | European Pat. Off. . |
| 0101253A2 | 2/1984 | European Pat. Off. . |
| 2155975 | 10/1985 | United Kingdom . |
| 83498 | 2/1983 | WIPO . |
| WO87/01377 | 3/1987 | WIPO . |

OTHER PUBLICATIONS

Chemical Abstracts, 88:189140b (1978).
Chemical Abstracts, 95:133605j (1981).
Chemical Abstracts, 109:53920a (1988).
Patent Abstracts of Japan, C-202, vol. 7, No. 289 (Dec. 23, 1983).
Patent Abstracts of Japan, C-307, vol. 9, No. 247 (Oct. 3, 1985).
CPI-Profile Booklet 1979, No. 46498B/25.
Chemical Abstracts, 98:179997d.
Johnson, J. Sci. Food Agric., 1984, 35, 1063–1066.
Johnson et al., J. Sci. Food Agric., 1985, 36, 789–793.
Chemical Abstracts, 102:165895h (1985).
Chemical Abstracts, 98:166945k (1983).

Primary Examiner—Ferris Lander
Attorney, Agent, or Firm—Wenderoth, Lind & Ponack

[57] ABSTRACT

Method of conditioning soils, in which copolymers which are composed of acrylamide and/or methacrylamide, a sulphonyl-containing, substituted acrylamide or methacrylamide, a multi-functional, water-soluble vinyl compound and, if appropriate, carboxyl-containing comonomers are added to the soils as soil conditioners.

8 Claims, No Drawings

SOIL CONDITIONERS

This application is a continuation of now abandoned application Ser. No. 07/566,232, filed Aug. 9, 1990.

The invention relates to a method of conditioning soils with sulphonyl-containing, cross-linked copolymers based on acrylamide or methacrylamide, sulphonic acids or salts thereof containing one vinyl group, a vinyl-containing cross-linking agent, and, if appropriate, carboxyl-containing comonomers.

Growing plants especially in sandy soils under arid or semi-arid conditions entails big problems. The water-holding capacity of the soil is an essential factor since the uptake of nutrients and the formation of roots by the plant depends decisively on the water content, or nutrient solution content, of the soil. Apart from the water supply, aeration and supply of oxygen to the roots is another essential factor which has an effect on the development of the plant, in particular the roots.

It is known to add carboxyl-containing copolymers to the soil, mainly to increase the retention capacity of water or aqueous solutions. Such soil conditioners which consist of a copolymer of acrylamide and a salt of acrylic acid which is cross-linked with methylenebisacrylamide are described, for example, in EP-A 72,214 and in German Offenlegungsschrift 3,344,638. EP-A 101,253 describes soilameliorants based on polyacrylamides which do not have ionic groups.

The disadvantage of the known soil conditioners is, in particular, the fact that they either do not have a sufficiently high absorption capacity, or their absorption capacity decreases greatly when salt-containing aqueous solutions are used instead of pure water. The absorption capacity is particularly greatly reduced when multi-valent cations such as, for example, $Ca^{2+}$, $Mg^{2+}$, $Fe^{2+}$ or $Fe^{3+}$, are present. These cations occur, for example, in various soils or they can be constituents of nutrient solutions. In particular in the arid areas, it is necessary to also water the plants with salt-containing water which, besides alkali metal ions and alkaline earth metal ions also contains multi-valent metal ions.

Furthermore, an additional disadvantage of the known soil conditioners is the fact that, when irrigation is effected with salt-containing water, their absorption capacity for pure water which is used in irrigation cycles at a later point in time, decreases greatly and in some cases irreversibly.

The interaction between swelling of the soil conditioner and the chemical composition, or salinity, of the irrigation water, salt concentrations of 2-8 g/l being possible, is mentioned, for example, in J. Sci. Food Agric. 1984 (35), pages 1063-1066 or 1985 (36), pages 789-793.

It was an aim of the present invention to eliminate the disadvantages of the known soil conditioners and to find in particular a soil conditioner which has a high retention capacity for water and salt solutions and which does not lose its good retention capacity for water and salt solutions even when salt solutions of mono- or multi-valent cations are repeatedly absorbed. Unexpectedly, it has been found that copolymers based on acrylamide and having sulphonyl groups in place of, or additionally to, carboxyl groups, can be used during a large number of absorption and desorption cycles of water and salt solutions and, during these processes, retain their high retention capacity for water and salt solutions.

The present invention therefore relates to a method of conditioning soils, which is characterized in that sulphonyl-containing, cross-linked copolymers are added to the soils, which copolymers are composed of A) 50 to 94.9 mol % of acrylamide and/or methacrylamide,
B) 5 to 49.9 mol % of a sulphonic acid or a salt thereof containing one vinyl group, of the general formula

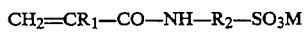

$$CH_2=CR_1-CO-NH-R_2-SO_3M$$

where
$R^1$ denotes hydrogen or a methyl group,
$R^2$ denotes a straight-chain or branched alkylene group having 1 to 6 C atoms and
M denotes hydrogen or a monovalent cation, and
C) 0.005 to 0.1 mol % of a multi-functional water-soluble vinyl compound, it being possible for the polymer component B to be substituted by 0 to 85 mol % of carboxyl-containing comonomers, based on the content of polymer component B.

Carboxyl-containing comonomers are understood as meaning, for example, substituted or unsubstituted acrylic acid or methacrylic acid and their salts or derivatives, as they are also used in accordance with the prior art for preparing soil conditioners. The greater the content of sulphonyl-containing polymer component B in relation to the carboxyl-containing comonomers, the greater the advantage of using the soil conditioners according to the invention. On the other hand, a low content of sulphonyl-containing polymer component B in the soil conditioner already brings an improvement compared with the prior art.

The use of copolymers, as soil conditioners, which are composed of 70 to 79.9 mol % of a polymer component A, 20 to 29.9 mol % of a polymer component B and 0.005 to 0.1 mol % of a polymer component C, is particularly advantageous. The preferred polymer component A is acrylamide, the preferred polymer component B is a salt of acrylamido-methylpropanesulphonic acid, and the preferred polymer component C is methylenebisacrylamide.

The use of copolymers with a polymer component A consisting of acrylamide, a polymer component B consisting of a salt of acrylamidomethylpropanesulphonic acid and a polymer component C consisting of methylenebisacrylamide is particularly preferred.

The copolymers according to the invention are particularly advantageously used when they additionally contain plant nutrients. Suitable plant nutrients are all those which are customary in agriculture. Particularly preferably, these nutrients are from the group of the nitrogen, phosphorus, potassium, iron, zinc, copper, manganese, molybdenum and boron salts.

Particularly advantageous growth substrates are those consisting of a mixture of soil, sand, peat, perlite, vermiculite, tree bark, wood shavings, organic fertilizer, straw, or a mixture of these constituents, with the copolymers according to the invention, for rearing plants. This growth substrate preferably contains 0.1 to 10 g/l copolymers.

The invention furthermore relates to a method of conditioning soils, in which method 0.1 to 10 g of copolymer are added per l of soil. The copolymers present in the soil are loaded, or reloaded, with nutrients dissolved in water, preferably cyclically. In this manner, it is possible to load the copolymer again and again with the nutrient solution in further loading cycles, either after the nutrients have been taken up by the roots, or after they have been leached by rain, also in the case of irrigation with salt-containing water. In this context, a particular advantage of the soil conditioner according to the invention is the fact that its absorption capacity for water and for aqueous salt solutions remains approximately at the same level, even after contact with electrolyte solutions, in particular with polyvalent cations. Another advantage is the fact that the absorbed nutrient salts are leached by the rain at a much lower rate than when known soil conditioners are used.

Furthermore, an additional advantage of the soil conditioner according to the invention can be seen in the fact that it imparts a loose and air-permeable structure, in particular when admixed to heavy soils, which makes possible good aeration and good supply of oxygen, which is particularly necessary for good root growth.

The soil conditioners according to the invention are prepared by known processes, for example in accordance with EP-A 068,189, by copolymerization of acrylamide or methacrylamide, a sulphonic acid containing one vinyl group, a multi-functional vinyl compound as the cross-linking agent, and, if appropriate, carboxyl-containing comonomers in aqueous solution.

In a preferred preparation process, plant nutrients are already added to the monomer solution before the polymerization step. This has the advantage of a particularly good and uniform distribution of the plant nutrients in the finished copolymer.

PREPARATION OF THE COPOLYMERS

Copolymer A 239.3 g of a 50% strength acrylamide solution ( 1.68 mol, 90 mol % ) and 85.64 g of 50% strength Na acrylamidomethylpropanesulphonate solution (0.19 mol, 10 mol %) were initially introduced at 20° C. into a 1000 ml glass reactor and 40.3 mg of methylenebisacrylamide (0.00026 mol, 0.014 mol %) were subsequently added. After the components had been mixed intimately, a pH of 4.95 was established using hydrochloric acid, and the mixture was diluted with 323 g of $H_2O$. After the reactor had been flushed with $N_2$ for 1 hour, the reaction was initiated using 10.5 mg of $Na_2S_2O_5$ and 21.0 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 730 g/g of polymer.

Copolymer B 142.16 g of a 50% strength acrylamide solution (1 mol, 60 mol % ) and 305.63 g of 50% strength Na acrylamidomethylpropanesulphonate solution (0.67 mol, 40 mol %) were initially introduced at 20° C. into a 1000 ml glass reactor, and 36 mg of methylenebisacrylamide (0.0023 mol, 0.014 mol %) were subsequently added. After the components had been mixed intimately, a pH of 4.85 was established using hydrochloric acid, and the mixture was diluted with 469 g of $H_2O$. After the reactor had been flushed with $N_2$ for 1 hour, the reaction was initiated using 9.4 mg of $Na_2S_2O_5$ and 18.7 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 800 g/g of polymer.

Copolymer C 142.16 g of a 50% strength acrylamide solution (1 mol, 70 mol %), 78.68 g of a 50% strength K acrylate solution (0.357 mol, 25 mol % ) and 35.04 g of 50% strength K acrylamidomethylpropanesulphonate solution (0.071 mol, 4.97 mol % ) were initially introduced at 20 ° C. into a 1000 ml glass reactor, and 87.98 mg of methylenebisacrylamide (0.00057 mol, 0.04 mol %) were subsequently added. After the components had been mixed, a pH of 4.85 was established using hydrochloric acid, and the mixture was diluted with 256 g of $H_2O$. After the reactor had been flushed with $N_2$ for 1 hour, the reaction was initiated using 48.9 mg of $Na_2S_2O_5$ and 97.8 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 700 g/g of polymer.

Copolymer D 239.3 g of a 50% strength acrylamide solution (1.68 mol, 90 mol %) and 85.64 g of 50% strength Na acrylamidomethylpropanesulphonate solution (0.19 mol, 10 mol %) were initially introduced at 20° C. into a 1000 ml glass reactor and 40.3 mg of methylenebisacrylamide (0.00026 mol, 0.014 mol %) were subsequently added. After the components had been mixed intimately, a pH of 4.95 was established using hydrochloric acid, and the mixture was diluted with 323 g of $H_2O$. 3.89 g of disodium ethylene-diaminetetraacetate and subsequently 0.972 g of a mineral salt mixture of 31% $MnSO_4·H_2O$, 35.6% $FeSO_4·7H_2O$, 21.9% $ZnSO_4·7H_2O$ and 11.5% $CuSO_4·5H_2O$ were subsequently dissolved in this monomer solution, after which procedure a pH of 4.85 was re-established. After the reactor had been flushed with $N_2$ for 1 hour, the reaction was initiated using 31.2 mg of $Na_2S_2O_5$ and 63.2 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 700 g/g of polymer.

Comparison Polymer CA 142.16 g of a 50% strength acrylamide solution (1 mol), 94.39 g of a 50% strength K acrylate solution (0.43 mol) and 236.6 g of $H_2O$ were initially introduced at 20° C. into a 1000 ml glass reactor, and 110 mg of methylenebisacrylamide (0.0007 mol), were subsequently added. After the components had been mixed, a pH of 7.0 was established using acrylic acid. After the reactor had been flushed with $N_2$ for 1 hour, the reaction was initiated using 40 mg of $Na_2S_2O_5$ and 81 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 510 g/g of polymer.

Comparison Polymer CB 72.06 g of acrylic acid (1 mol), and 283.7 g of $H_2O$ were initially introduced at 20° C. into a 1000 ml glass reactor, and the stirred mixture was slowly neutralized with 46.76 g of 90% strength KOH. 23.13 mg of methylenebisacrylamide (0. 00015 mol), were subsequently admixed, and a pH of 7.0 was established using acrylic acid. After the reactor had been flushed with $N_2$ for 1 hour, the reaction was initiated using 17.9 mg of $Na_2S_2O_5$ and 57 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 475 g/g of polymer.

Comparison Polymer CC 142.16 g of a 50% strength acrylamide solution (1 mol), and 142.16 g of $H_2O$ were initially introduced at 20° C. into a 1000 ml glass reactor, and 21.6 mg of methylenebisacrylamide (0. 00014 mol), were added. After the reactor had been flushed with $N_2$ for 1 hour, the reaction was initiated using 5.68 mg of $Na_2S_2O_5$ and 11.37 mg of $(NH_4)_2S_2O_8$. The reaction proceeded adiabatically and was complete after 2 hours. The resulting polymer gel was comminuted and dried for 16 hours at 80° C. and 1 bar. The water retention capacity was 120 g/g of polymer.

Example 1

The copolymer A used according to the invention was tested for its absorption capacity for $H_2O$ and for a 500 ppm $FeCl_3$ solution in comparison with the comparison polymers CA and CB, which are also commercially available. For this purpose, the polymer (grain size 0.315 to 0.5 mm) was scattered on a wire screen of diameter 200 mm and mesh size 0.25 mm and immersed in the absorption solution, with stirring. When the swelling process was complete, the screen was removed from the liquid which was allowed to run off for 25 minutes, and the weight increase was determined. The swelling times (in hours) are listed in Table 1. Each of the 3 polymers was first swollen in $H_2O$, then in a 500 ppm $FeCl_3$ solution and finally 7 times in $H_2O$, fresh water being used in each of the 7 water cycles.

It can be seen from the absorption capacities (g of $H_2O$, or g of solution, per g of copolymer) compiled in Table 1, that the copolymer A according to the invention retains its capacity for uptake of water even after the treatment with $FeCl_3$ solution, while the comparison polymers CA and CB had irreversibly lost their capacity for uptake of water, even after repeated watering.

TABLE 1

| | Absorption capacity in g/g | | |
|---|---|---|---|
| | Swelling time in h | Copolymer A | Comparison polymer CA | Comparison polymer CB |
| $H_2O$ (1) | 15 | 730 | 510 | 475 |
| $FeCl_3$ (500 ppm) | 15 | 34 | 10 | 14 |
| $H_2O$ (2) | 3 | 262 | 11 | 16 |
| $H_2O$ (3) | 3 | 357 | 11 | 17 |
| $H_2O$ (4) | 15 | 569 | 13 | 18 |
| $H_2O$ (5) | 3 | 616 | 13 | 18 |
| $H_2O$ (6) | 3 | 671 | 13 | 18 |
| $H_2O$ (7) | 15 | 790 | 13 | 18 |
| $H_2O$ (8) | 3 | 793 | 13 | 18 |

Example 2

Analogously to Example 1, the absorption capacity for Ca salts was determined, each of the polymers being treated in 3 cycles in alternation with $H_2O$ and a $CaCl_2$ solution (400 ppm of Ca ions).

The results are compiled in Table 2. The capacity for uptake of the Ca solution as well as the capacity for uptake of water, both before and in each case after a treatment with the Ca solution, are much higher in the copolymer according to the invention than in the comparison polymers.

TABLE 2

| | Absorption capacity in g/g | | |
|---|---|---|---|
| | Swelling time in h | Copolymer A | Comparison polymer CA | Comparison polymer CB |
| $H_2O$ | 20 | 730 | 510 | 475 |
| 1. Ca ions (400 ppm) | 18 | 58 | 33 | 23 |
| $H_2O$ | 20 | 306 | 75 | 6 |
| 2. Ca ions (400 ppm) | 18 | 58 | 29 | 7 |
| $H_2O$ | 20 | 340 | 68 | 8 |
| 3. Ca ions | 18 | 56 | 19 | 6 |
| $H_2O$ | 20 | 343 | 72 | 7 |

Example 3

Analogously to Example 1, the absorption capacity for a solution of trace elements was determined, the polymers being treated in alternation with $H_2O$ and a 500 ppm trace element solution (27.9% $MnSO_4 \cdot H_2O$, 12.6% $FeSO_4 \cdot 7H_2O$, 18.9% $CuSO_4 \cdot 5H_2O$, 28.3% $ZnSO_4 \cdot 7H_2O$, 9.2% boric acid, 4.0% $Na_2MoO_4$).

Table 3 compares the results of the copolymer A according to the invention, which are far better even after repeated treatment in alternation, with those of comparison polymers CA and CB

TABLE 3

| | Absorption capacity in g/g | | |
|---|---|---|---|
| | Swelling time in h | Copolymer A | Comparison polymer CA | Comparison polymer CB |
| $H_2O$ | 18 | 730 | 510 | 475 |
| 1. Trace element solution (500 ppm) | 2 | 85 | 23 | 7 |
| $H_2O$ | 18 | 501 | 365 | 12 |
| 2. Trace element solution (500 ppm) | 20 | 101 | 3 | 11 |
| $H_2O$ | 22 | 620 | 4 | 1 |

Example 4

Analogously to Example 1, the absorption capacity for 1200 ppm hydroponic solutions having an N:P:K ratio of 1:1.5:2, followed by $H_2O$ treatment, in several cycles was tested. Composition of the hydroponic solution:

45 g/l ammonium nitrate, 100 g/l potassium nitrate, 26 g/l ammonium hydrogen phosphate, 26 g/l magnesium nitrate×$6H_2O$, 62 g/l potassium hydrogen phosphate, 1.5 g/l iron sulphate×$7H_2O$, 0.4 g/l manganese sulphate×$H_2O$, 0.08 g/l copper sulphate×$5H_2O$, 0.01 g/l cobalt nitrate×$7H_2O$, 0.25 g/l boric acid, 5.0 g/l Na EDTA, 0.08 g/l zinc sulphate×$7H_2O$, and 0.01 g/l sodium molybdate.

The solution was diluted to a concentration of 1200 ppm.

The results of the absorption cycles for copolymer A and for comparison polymers CA and CC are compiled in Table 4. The uptake capacity of copolymer A is by far higher than that of the comparison polymers and even increases in the course of the cycles, while that of the comparison polymers decreases, in some cases even drastically.

TABLE 4

| | Absorption capacity in g/g | | | |
|---|---|---|---|---|
| | Swelling time in h | Copolymer A | Comparison polymer CA | Comparison polymer CC |
| H₂O | 16 | 730 | 510 | 120 |
| 1. Hydroponic solution | 16 | 116 | 65 | 28 |
| H₂O | 5 | 836 | 266 | 23 |
| 2. Hydroponic solution | 16 | 126 | 57 | 28 |
| H₂O | 5 | 1005 | 295 | 25 |
| 3. Hydroponic solution | 16 | 137 | 42 | 28 |
| H₂O | 5 | 1097 | 286 | 26 |
| 4. Hydroponic solution | 16 | 131 | 38 | 27 |

Example 5

To test for loading capacity with saline water, the soil conditioners were mixed with 600 g of sand in an amount of 3 g/l of sand, the mixture was packed to a height of 15 cm into glass coles of diameter 6 cm, and the columns were treated with 100 ml of water of increasing salinity (1000–6000 ppm), corresponding to an amount of irrigation of 35.4 mm.

Ion composition in the water:

6% of $HCO_3^-$, 51 32% of $Cl^-$, 8.88% of $SO_4^{2-}$, 19 9% of $Na^+$ 1.54% of $K^+$, 5.91% of $Ca^{2+}$, 6.45% of $Mg^{2+}$.

The percentage relative absorption capacity compared with pure sand (=100%) is compiled in Table 5 for mixtures of sand with 3 g of each copolymer A, B or C and also comparison polymer CA, CB or CC, per liter of sand. The absorption capacity of the soil conditioners according to the invention is far better.

TABLE 5

| Relative absorption capacity of the soils (%) | | | | | |
|---|---|---|---|---|---|
| Salinity of the water in ppm | 1000 | 2000 | 3000 | 4000 | 6000 |
| 3 g of A/l | 165 | 157 | 151 | 150 | 149 |
| 3 g of B/l | 193 | 178 | 168 | 161 | 154 |
| 3 g of C/l | 161 | 154 | 145 | 142 | 140 |
| 3 g of CA/l | 160 | 130 | 119 | 120 | 117 |
| 3 g of CB/l | 145 | 100 | 100 | 100 | 100 |
| 3 c of CC/l | 123 | 123 | 121 | 122 | 121 |
| Comparison soil | 100 | 100 | 100 | 100 | 100 |

Example 6

To demonstrate that the leaching of trace elements from soils conditioned according to the invention is low, the polymers A, B, CA, CB and CC were mixed analogously to Example 5 with 600 g of sand in an amount of 3 g/l, and the mixtures were packed into glass columns of diameter 6 cm. 176 mm of the salt solution described in Example 5 with a content of 1000 ppm were then applied to simulate an irrigation of 176 mm and drawn off at the bottom. A Cu solution was then passed through the columns in an amount of 2 mg/l of soil, and irrigation with the salt solution was continued in several steps up to an irrigation level of a further 283 mm. The percentage of the initial Cu amount which was still present in the soil was determined for the individual soils in each case after 0, 36, 70, 106, 140, 176, 212, 247 and 283 mm of irrigation. The data are compiled in Table 6.

TABLE 6

| Retention of Cu ions in % of the amount applied | | | | | | | | | |
|---|---|---|---|---|---|---|---|---|---|
| Irrigation in mm | 0 | 36 | 70 | 106 | 140 | 176 | 212 | 247 | 283 |
| comparison soil | 44.2 | 8.7 | 6.6 | 6.2 | 6.0 | 5.8 | 5.6 | 5.6 | 5.6 |
| 3 g of A/l | 57.2 | 22.9 | 18.9 | 17.3 | 16.0 | 15.3 | 14.9 | 14.4 | 14.2 |
| 3 g of B/l | 60.6 | 26.5 | 24.5 | 23.5 | 22.8 | 22.4 | 22.2 | 22.2 | 22.2 |
| 3 g of CA/l | 52.1 | 19.1 | 8.4 | 4.7 | 2.7 | 1.9 | 1.4 | 1.0 | 0.7 |
| 3 g of CB/l | 56.1 | 19.1 | 8.9 | 5.5 | 4.1 | 3.8 | 3.7 | 3.7 | 3.7 |
| 3 g of CC/l | 59.2 | 19.1 | 12.0 | 6.9 | 6.1 | 5.7 | 5.5 | 5.5 | 5.5 |

Examples 7 and 8

The leaching of trace elements from conditioned soils by irrigation with salt water was tested analogously to Example 6, but the solutions applied to the columns instead of the Cu solution were, in Example 7, a Zn solution in an amount corresponding to 3.5 mg of Zn per l of soil, and, in Example 8, a Mn solution in an amount corresponding to 6.875 g of Mn per l of soil.

The percentages of the amounts of Zn or Mn which remain in the soil after the individual irrigation steps are compiled in Tables 7 and 8 as a function of the amount taken originally.

TABLE 7

| Retention of Zn ions in % of the amount applied | | | | | | | | | |
|---|---|---|---|---|---|---|---|---|---|
| Irrigation in mm | 0 | 36 | 70 | 106 | 140 | 176 | 212 | 247 | 283 |
| comparison soil | 41.8 | 7.5 | 4.7 | 4.2 | 3.9 | 3.5 | 3.4 | 3.3 | 3.2 |

TABLE 7-continued

| Retention of Zn ions in % of the amount applied | | | | | | | | | |
|---|---|---|---|---|---|---|---|---|---|
| 3 g of A/l | 57.9 | 25.0 | 20.8 | 18.9 | 17.3 | 16.2 | 15.9 | 15.5 | 15.3 |
| 3 g of B/l | 58.8 | 24.9 | 21.7 | 20.5 | 19.5 | 18.9 | 18.5 | 18.1 | 17.9 |
| 3 g of CA/l | 50.9 | 18.1 | 9.8 | 6.5 | 4.7 | 4.1 | 3.8 | 3.6 | 3.2 |
| 3 g of CB/l | 51.3 | 15.5 | 7.3 | 4.3 | 3.2 | 2.9 | 2.7 | 2.5 | 2.3 |
| 3 g of CC/l | 58.0 | 17.5 | 11.0 | 8.8 | 7.5 | 6.7 | 6.5 | 4.7 | 3.5 |

TABLE 8

| Retention of Mn ions in % of the amount applied | | | | | | | | | |
|---|---|---|---|---|---|---|---|---|---|
| Irrigation in mm | 0 | 36 | 70 | 106 | 140 | 176 | 212 | 247 | 283 |
| comparison soil | 49.9 | 20.7 | 11.1 | 7.5 | 7.3 | 7.1 | 7.0 | 6.5 | 6.3 |
| 3 g of A/l | 63.4 | 36.3 | 28.4 | 24.0 | 20.2 | 18.1 | 16.7 | 15.0 | 14.2 |
| 3 g of B/l | 63.3 | 34.7 | 27.7 | 24.5 | 21.7 | 19.6 | 18.2 | 16.8 | 15.9 |
| 3 g of CA/l | 53.7 | 23.1 | 18.0 | 14.9 | 12.7 | 11.0 | 9.8 | 8.3 | 6.9 |
| 3 g of CB/l | 54.6 | 21.2 | 18.3 | 16.6 | 15.5 | 14.5 | 13.8 | 12.2 | 11.3 |
| 3 g of CC/l | 60.5 | 28.5 | 16.7 | 11.1 | 7.7 | 5.6 | 4.8 | 3.9 | 3.5 |

Example 9

Copolymer A was swollen with a solution containing MnSO4, FeSO4 and CuSO4 in such a way that after drying it had the same content of absorbed trace elements as copolymer D, where the salts were already dissolved in the monomer solution prior to polymerization.

Analogously to Example 5, both copolymers were mixed with sand, packed into glass columns and irrigated 8 times with saline water (1000 ppm salt content) at a level of 36 mm in each case.

The percentages of the Fe which remains in the soil after the individual irrigation steps, relative to the initial content of iron in the conditioned soil, are compiled in Table 9. The deposit effect of nutrients is better when copolymer D is used than when copolymer A with diffusion-absorbed trace elements is used.

TABLE 9

| Retention of Fe in % of the initial content | | | | | | | | |
|---|---|---|---|---|---|---|---|---|
| Irrigation steps (36 mm in each case) | 1 | 2 | 3 | 4 | 5 | 6 | 7 | 8 |
| 3 g of D/l | 82 | 72 | 63 | 59 | 56 | 54 | 52 | 51 |
| 3 g of A + absorbed trace elements/l | 64 | 37 | 29 | 25 | 21 | 18 | 16 | 15 |

What we claim is:

1. A method of conditioning soils in agriculture to improve water retention and aeration of the soils, which consists essentially of adding sulphonyl-containing, cross-linked copolymers to the soils, which copolymers are composed of the polymer components A) 50 to 94.9 mol % of a member selected from the group consisting of acrylamide, methacrylamide and a combination thereof, B) 5 to 49.9 mol % of a member selected from the group consisting of a sulphonic acid and a salt thereof containing one vinyl group, of the general formula $$CH_2=CR_1—CO—NH—R_2—SO_3M$$

where $R^1$ denotes a member selected from the group consisting of hydrogen and a methyl group, $R^2$ denotes a member selected from the group consisting of a straight-chain alkylene group having 1 to 6 C atoms and a branched chain alkylene group having 1 to 6 C atoms and M denotes a member selected from the group consisting of hydrogen and a monovalent cation, and C) 0.005 to 0.1 mol % of a multi-functional water-soluble vinyl compound as a cross-linking agent, wherein the polymer component B can be substituted by 0 to 85 mol % of carboxyl-containing comonomers, based on the content of polymer component B.

2. The method of conditioning soils according to claim 1, wherein the copolymers are composed of 70 to 79.9 mol % of a polymer component A, 20 to 29.9 mol % of a polymer component B and 0.005 to 0.1 mol % of a polymer component C.

3. The method of conditioning soils according to claim 1, wherein the polymer component A is acrylamide, the polymer component B is a salt of acrylamidomethylpropanesulphonic acid, and the polymer component C is methylenebisacrylamide.

4. The method of conditioning soils according to claim 1, wherein the copolymers additionally contain plant nutrients.

5. The method of conditioning soils according to claim 4, wherein the plant nutrients are selected from the group of the nitrogen, phosphorus, potassium, iron, zinc, copper, manganese, molybdenum and boron salts.

6. The method of conditioning soils according to claim 1 or 4, wherein 0.1 to 10 g/l copolymer is added to the soil.

7. The method of conditioning soils according to claim 1 or 4, wherein the copolymer present in the soil is loaded, or reloaded, cyclically with nutrients dissolved in water.

8. A process for preparing copolymers, which comprises adding plant nutrients to a monomer solution consisting essentially of components A, B and C according to claim 1, and copolymerizing components A, B and C in the resultant monomer solution.

* * * * *